(12) United States Patent
Zhang et al.

(10) Patent No.: US 9,256,914 B2
(45) Date of Patent: Feb. 9, 2016

(54) GRAPHIC CARD FOR COLLABORATIVE COMPUTING THROUGH WIRELESS TECHNOLOGIES

(75) Inventors: Yu Zhang, Shenzhen (CN); Hao Zhu, Shenzhen (CN); Shuanghu Yan, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 526 days.

(21) Appl. No.: 13/570,173

(22) Filed: Aug. 8, 2012

(65) Prior Publication Data
US 2013/0300646 A1 Nov. 14, 2013

(30) Foreign Application Priority Data

May 14, 2012 (CN) .......................... 2012 1 0149327

(51) Int. Cl.
| | | |
|---|---|---|
| G06F 15/80 | (2006.01) | |
| G06T 1/20 | (2006.01) | |
| H04W 88/02 | (2009.01) | |
| H04W 92/16 | (2009.01) | |

(52) U.S. Cl.
CPC .................. *G06T 1/20* (2013.01); *H04W 88/02* (2013.01); *H04W 92/16* (2013.01)

(58) Field of Classification Search
CPC .............. G09G 5/363; G09G 2370/16; G09G 2352/00; G06F 3/14; G06F 3/1438; G06F 9/3877
USPC ........................................... 345/520, 503–505
See application file for complete search history.

(56) References Cited

U.S. PATENT DOCUMENTS

| | | | | |
|---|---|---|---|---|
| 8,199,159 | B2 * | 6/2012 | Lee et al. ........................ | 345/519 |
| 8,386,672 | B2 * | 2/2013 | Tsuei et al. ..................... | 710/62 |
| 2003/0025648 | A1 * | 2/2003 | Glen et al. ..................... | 345/2.3 |
| 2011/0134111 | A1 * | 6/2011 | Stone ............................. | 345/419 |

FOREIGN PATENT DOCUMENTS

| | | |
|---|---|---|
| CN | 101046734 A | 10/2007 |
| CN | 201628949 U | 11/2010 |
| CN | 101901042 A | 12/2010 |
| CN | 102135949 A | 7/2011 |

OTHER PUBLICATIONS

Office Action from Chinese Patent Application No. 201210149327.6, dated Nov. 3, 2015.

* cited by examiner

*Primary Examiner* — Hau Nguyen
(74) *Attorney, Agent, or Firm* — Zilka-Kotab, PC

(57) ABSTRACT

A graphics card is provided. The graphics card comprises: a Graphics Processing Units (GPU) for data computing; and a wireless controller for wirelessly receiving data from other graphic cards or sending data to the other graphics cards, and communicating with the GPU by bus. The graphic card able provided by the present invention can provide a low-cost solution with more powerful computing capabilities to meet the demands for computing complex problems in the fields of commerce, industry, and science.

20 Claims, 5 Drawing Sheets

GRAPHIC CARD FOR COLLABORATIVE COMPUTING THROUGH WIRELESS TECHNOLOGIES

PRIORITY AND RELATED APPLICATION DATA

The present application claims the priority of Chinese Patent Application No. 201210149327.6, filed on May 14, 2012, which is incorporated herein by reference.

FIELD

The present disclosure relates generally to graphics cards, and particularly to graphics cards for collaborative computing through wireless technologies.

BACKGROUND

Graphics Processing Units (GPU) are the processors designed to handle graphic work on PC, workstations, or gaming machines. The GPU can be integrated into a graphics card. FIG. 1 shows the architecture diagram of a graphic card 100 in the prior art with GPU 101 as the center chip. As shown in the figure, the graphics card 100 comprises a GPU101, a memory chip 102, a display interface 103, a motherboard interface 104 and a power chip 105. The GPU 101 can be used for various types of data processing, and is connected by bus with the memory chip 102, the display interfaces 103, the motherboard interface 104 and power chip 105 to communicate with them. The memory chip 102 is used for storing the data needed by the GPU for computing and the computing results. The display interface 103 is used to output the graphic data to a monitor for display. The motherboard interface can be a PCI Express interface and it is used to communicate with the motherboard for data exchange. The power chip 105 is used to provide electrical power for the normal operation of the graphics card 100.

With the development of technologies, the development of GPU general computing technology has attracted quite a lot of concerns. GPU is no longer limited to graphic processing. In the fields of floating-point computing and parallel computing, GPU performances can be tens of times or even a hundred times of the GPU performances and provide more computing power than the GPU for large-scale data computing. However, the data computing power of a single GPU is still limited and the data computing power of a single GPU is about 900 GFlops (Giga Float Operations) at the most.

Therefore, there is a need for low-cost solutions with more powerful computing capabilities perform data processing with a computing speed of thousands of GFLOPS, to meet the demands for computing complex problems in the fields of commerce, industry, and science.

SUMMARY OF THE INVENTION

The present invention is related to a graphics card for collaborative computing through wireless technologies. The graphics card comprises: a Graphics Processing Units (GPU) for data computing; and a wireless controller for wirelessly receiving data from other graphic cards or sending data to the other graphics cards, and communicating with the GPU by bus.

Preferably, the card further comprises: a memory chip, configured to store data and connected to the GPU by bus; a output interface, configured to communicate with a output device and connected to the GPU by bus; a motherboard interface, configured to communicate with the motherboard and connected to the GPU by bus; and a power chip, for providing power.

Preferably, the wireless controller is configured to modulate or demodulate the received data in accordance with the RF standard using RF carriers.

Preferably, the RF standard is one of the following communication standards: IEEE802.11, 802.11n and 802.11ac, Bluetooth or ultra broadband.

Preferably, the wireless controller is a chip or circuit that has the function of wireless control Preferably, the card further comprises a master card module, wherein the master card module is used for: sending a help request when encountering too heavy computing loads; ending, if no graphic card is able to accept the help request; sending the data to be processed to a second graphic card if the second graphic card is able to accept the help request; receiving the processing result from the second graphic card.

Preferably, the card further comprises a slave card module, wherein the slave card module is used for: determining whether its GPU has free resources when receiving help requests from other graphic cards; rejecting the help request, if its GPU has no free resources; accepting the help request if its GPU has free resources, and receiving data to be processed from the graphic card that sends the help request and processing the received data; and sending the process result to the graphic card that sends the help request, after all the data processing work is completed.

Preferably, the motherboard interface is a PCI Express interface.

In another aspect of the invention, a computing device is also provided. The device comprises: an input device, for inputting the data needed by the computing; a host, comprising a graphic card, the graphic card comprising: a Graphics Processing Units (GPU) for data computing; and a wireless controller for wirelessly receiving data from other graphic cards or sending data to the other graphics cards, and communicating with the GPU by bus; and an output device, for outputting computing results.

Preferably, the graphic card further comprises: a memory chip, configured to store data and connected to the GPU by bus; a output interface, configured to communicate with a output device and connected to the GPU by bus; a motherboard interface, configured to communicate with the motherboard and connected to the GPU by bus; and Preferably, the wireless controller is configured to modulate or demodulate the received data in accordance with the RF standard using RF carriers.

Preferably, the RF standard is one of the following communication standards: IEEE802.11, 802.11n and 802.11ac, Bluetooth or ultra broadband.

Preferably, the wireless controller is a chip or circuit that has the function of wireless control.

Preferably, the graphic card further comprises a master card module, wherein the master card module is used for: sending help request when encountering too heavy computing loads; ending, if no graphic card is able to accept the help request; sending the data to be processed to a second graphic card if the second graphic card is able to accept the help request; receiving the processing result from the second graphic card.

Preferably, the graphic card further comprises a slave card module, wherein the slave card module is used for: determining whether its GPU has free resources when receiving help requests from other graphic cards; rejecting the help request, if its GPU has no free resources; accepting the help request if its GPU has free resources, and receiving data to be processed from the graphic card that sends the help request and processing the received data; and sending the processing result to the graphic card that sends the help request, after all the data processing work is completed.

In yet another aspect of the invention, a method for collaborative computing through wireless technologies with multiple graphic cards described above is also provided. The method comprises; sending a help request when a first graphic card has too heavy computing loads; ending, if no graphic card is able to accept the help request; the first graphic card sending the data to be processed to a second graphic card if the second graphic card is able to accept the help request; the second graphic card processing the received data; the second graphic card sending the processing result to the first graphic card, after all the data processing work is completed.

Preferably, the graphic card further comprises: a memory chip, configured to store data and connected to the GPU by bus; a output interface, configured to communicate with a output device and connected to the GPU by bus; a motherboard interface, configured to communicate with the motherboard and connected to the GPU by bus; and a power chip, for providing power.

Preferably, the wireless controller is configured to modulate or demodulate the received data in accordance with the RF standard using RF carriers.

Preferably, the RF standard is one of the following communication standards: IEEE802.11, 802.11n and 802.11ac, Bluetooth or ultra broadband.

Preferably, the wireless controller is a chip or circuit that has the function of wireless control.

The graphic card provided by the present invention can perform collaborative computing through wireless technologies. Multiple of the graphic cards can communicate wirelessly, so as to take full advantage of the GPU computing powers of all the graphics cards within this wireless network. It appears to the user that the performance of the computing device he/she operates is greatly increased. Moreover, the graphics card provided by the present invention can save costs. The computing efficiency is raised through the collaborative computing among the devices, instead of using one strong and expensive computing device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Example embodiments are described herein in the context of graphics cards for collaborative computing through wireless technologies. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Reference will now be made in detail to the preferred embodiments of the present invention, examples of which are illustrated in the accompanying drawings.

Figure 1:
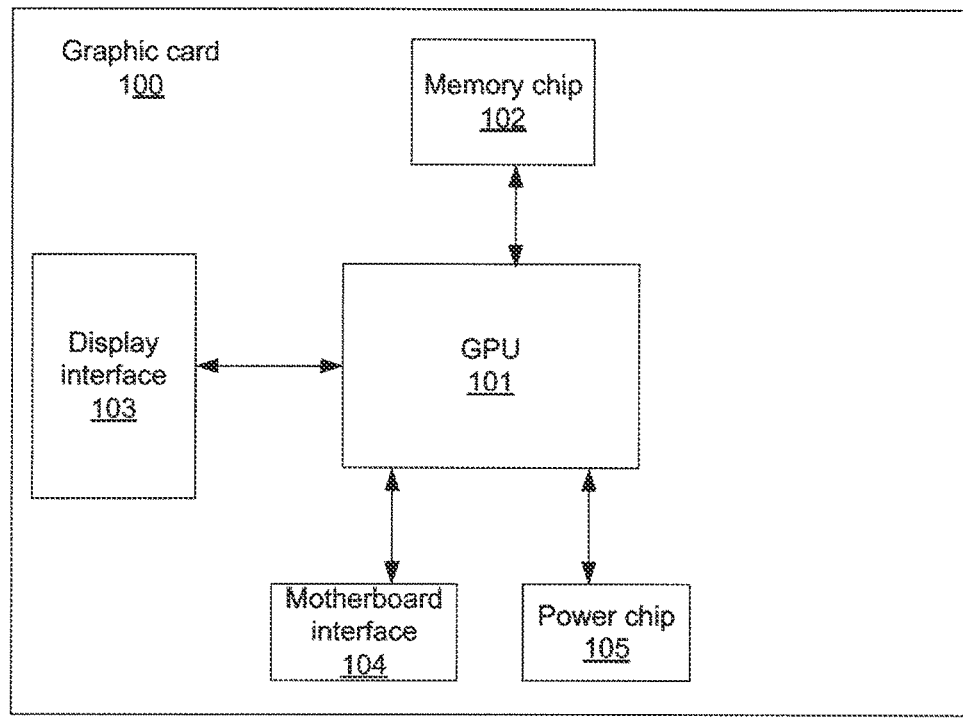
FIG. 1 shows the architecture diagram of a graphic card in the prior art.
Figure 2:
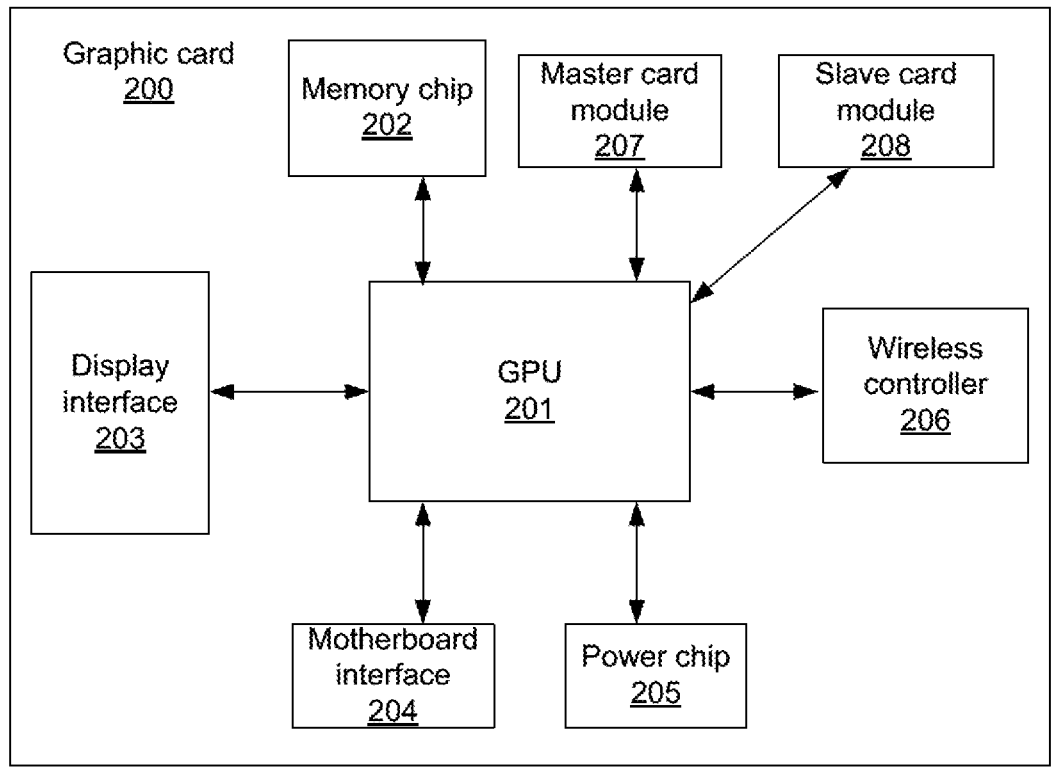
FIG. 2 illustrates the block diagram of a graphic card provided by the present invention in accordance with one embodiment of the present invention.

In one aspect of the invention a graphic card 200 for collaborative computing through wireless technologies is provided, which can communicate with other graphic cards through wireless technologies. FIG. 2 illustrates the block diagram of a graphic card 200 provided by the present invention in accordance with one embodiment. The graphic card 200 comprises GPU201, a memory chip 202, a display interface 203, a motherboard interface 204, a power chip 205 and a wireless controller 206. The memory chip 202 is used for storing the data needed by the GPU for computing and the computing results. The display interface 203 is used to output the graphic data to a monitor for display. The motherboard interface can be a PCI Express interface and it is used to communicate with the motherboard for data exchange. The power chip 205 is used to provide electrical power for the normal operation of the graphics card 200.

The wireless controller 206 connects to GPU by bus and communicates wirelessly with other graphic cards with wireless communication capabilities of other computing devices. The wireless controller 206 is configured to modulate or demodulate the received data in accordance with the RF standard using RF carriers. The communication means among the wireless controller 206 and other graphic cards can be wireless communication ways with the wireless transmitting and receiving functions, such as wifi, Bluetooth or ultra-broadband and so on. The communication standards can be the mainstream and the next-generation versions of wireless communication standards of IEEE802.11, 802.11n and 802.11ac. Bluetooth or ultra broadband. In one embodiment, the wireless controller 206 can be productions of Broadcom, such as chip BCM4331 with the 2.4 GHz and 5 GHz dual-band and 3 groups of sending and receiving antenna modules to achieve up to 450 Mb/s data transfer speed, or chip BCM4352 supporting dual-stream 802.11ac specification with a transfer speed of 867 Mb/s, or chip BCM4360 with 3 stream 802.11ac specification and a transmission speeds of up to 1.3 Gb/s.

Figure 3:
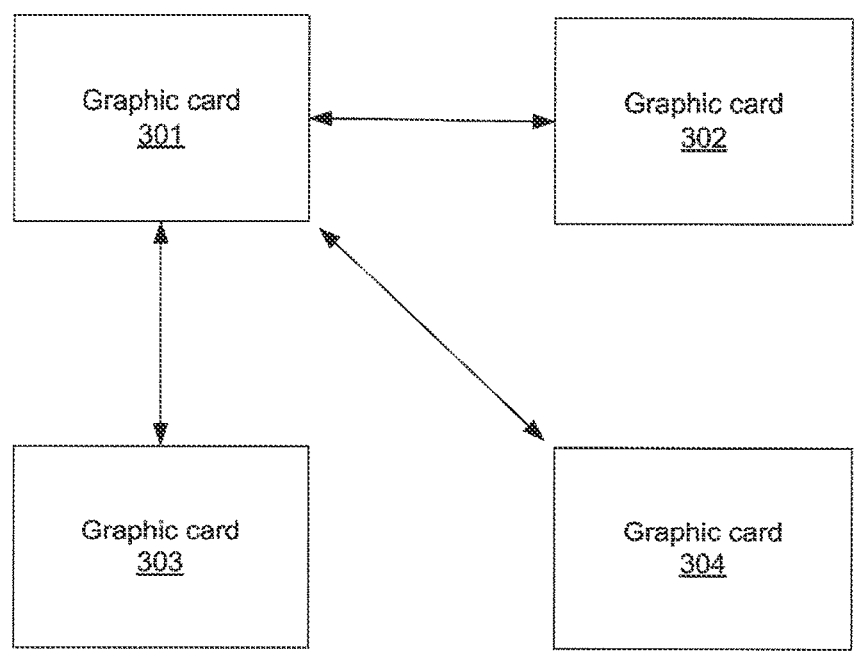
FIG. 3 shows a schematic diagram of the LAN composed of multiple graphic cards with wireless communication capabilities according to an exemplary embodiment of the invention.
Figure 4:
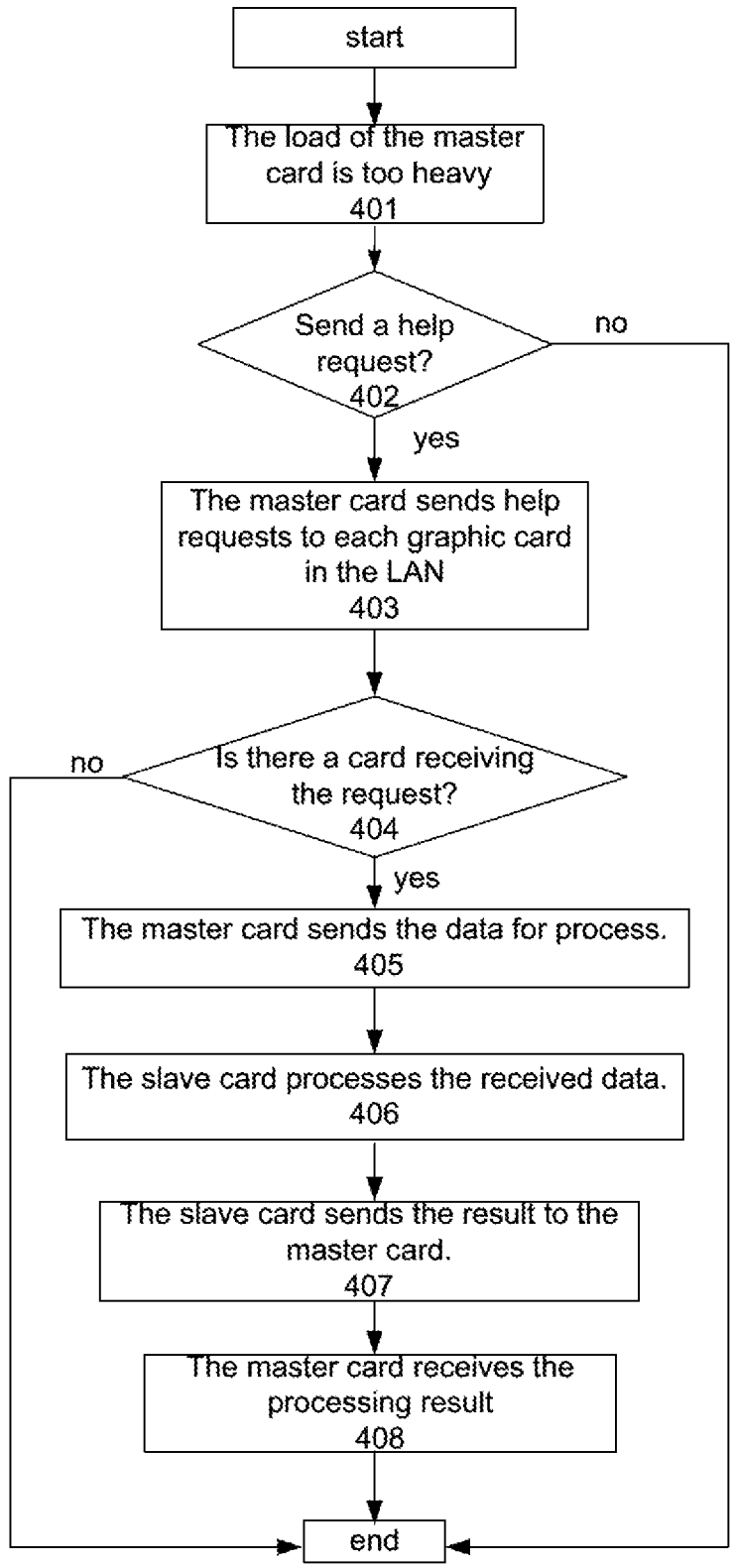
FIG. 4 shows a flow chart for collaborative computing of multiple graphics cards using wireless communication technologies according to one exemplary embodiment of the invention.

FIG. 3 shows a schematic diagram of the LAN 300 according to an exemplary embodiment of the invention. LAN 300 can include multiple graphic cards with wireless communication capabilities, such as a graphics card 301, a graphics card 302, a graphics card 303, and a graphics card 304 etc. The graphics cards 301-304 all have wireless controllers so that all of them can perform data communications using wireless technologies. FIG. 4 shows a flow chart for collaborative computing of multiple graphics cards using wireless communication technologies according to one exemplary embodiment of the invention. Depending on the embodiments, additional steps may be added, others removed, and the ordering of the steps may be changed.

In step 401, a graphic card in LAN 300 is performing data processes. In step 402, when the computing load of a graphic card in LAN 300, such as the graphic card 301, is too heavy, the graphic card 301 can be regarded as the master card in this case and the rest of the graphic cards in LAN 300 are regarded as slave cards. The graphic card 301 can select to send help requests to each graphic card, such as the graphic card 302, the graphic card 303, the graphic card and so on, in turn in the LAN using wireless communication means in step 403. If no graphic card is able to accept the request, then the process ends. Otherwise, if a graphic card, such as the graphic card 303, is able to accept the request, then in step 405, the graphic card 301 sends the data to be processed in package to the graphic card 303. Then in step 406, the graphic card 303 processes the data accepted from the graphic card 301. When the graphic card 303 finishes the data processing, then in step 406, the graphic card 303 sends the result to the graphic card 301. In step 408, the graphic card 301 receives the result from the graphic card 303. Under normal circumstances, the graphic cards in the LAN are not divided into master cards and slave cards. Only when a graphic card encounters a bottleneck of data process and sends a help request, is the graphic card a master card in this case and the other graphic cards are slave cards.

In one embodiment, the graphic card 301 comprises a master card module 207 for sending help request when encountering too heavy computing loads. If no graphic card is able to accept the request, then the process ends. Otherwise, if a graphic card is able to accept the request, then the data to be processed are sent to the graphic card that is able to accept the request. Then the processing result is received from the graphic card that accepted the request. In one embodiment, the graphic card 301 further comprises a slave card module 208 for receiving help requests sent from other graphic cards and determines if its GPU has free resources. If it has no idle resource, then the request is rejected. Otherwise, if it has free resources, then the request is accepted and receives data to be processed from the graphic card that sends the help request for process. After all the data processing work is completed, the process result is sent to the graphic card that sends the help request.

Figure 5:
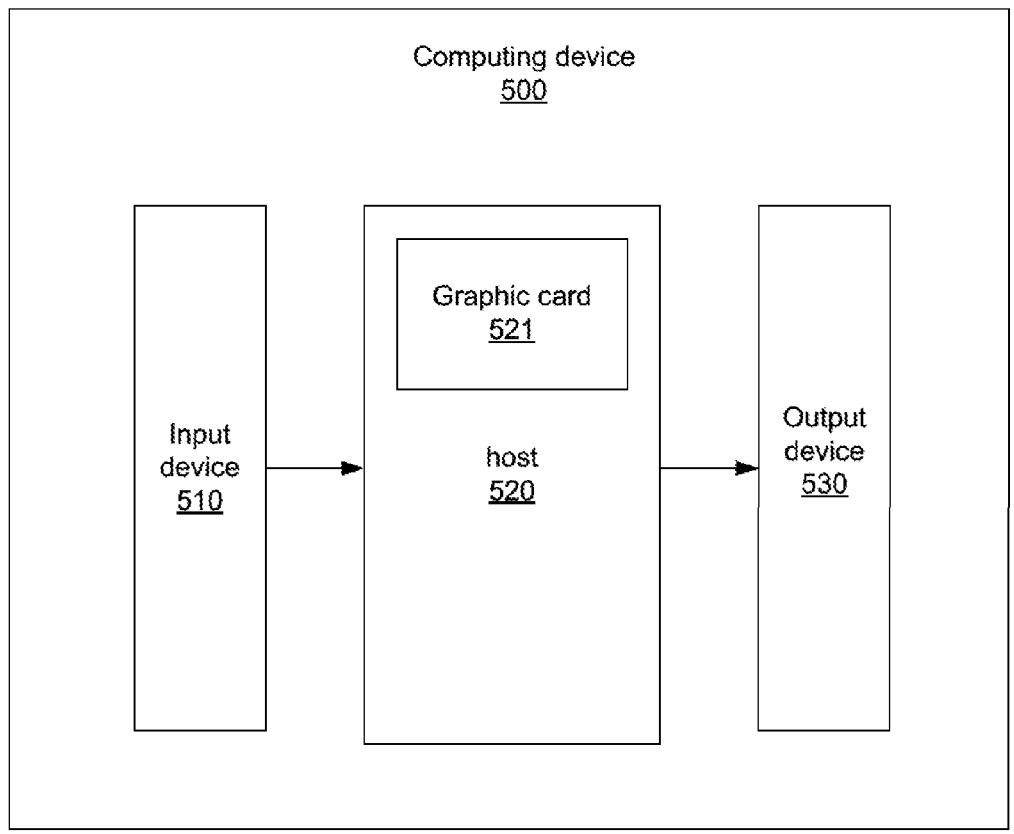
FIG. 5 shows a schematic diagram computing device that can implement the graphics card provided by the present invention.

FIG. 5 shows a schematic diagram computing device 500 that can implement the graphics card provided by the present invention. The device comprises: an input device 510, a host 520 and an output device 530. Wherein the input device 510 is used for inputting the data needed by the computing. The host 520 includes a graphics card 521 provided by the present invention, which is used for all types of data computing or collaborative computing with other graphic cards. And the output device 530 is used for outputting computing results.

Therefore, the present invention provides a graphic card capable of performing collaborative computing through wireless technologies. Multiple of the graphic cards can communicate wirelessly, so as to take full advantage of the GPU computing powers of all the graphics cards within this wireless network. It appears to the user that the performance of the computing device he/she operates is greatly increased. Moreover, the graphics card provided by the present invention can save costs. The computing efficiency is raised through the collaborative computing among the devices, instead of using one strong and expensive computing device.

It should be appreciated that various modifications, adaptations and alternative embodiments thereof may be made within the scope and spirit of the present invention. The invention is further defined by the following claims.

What is claimed is:

1. A graphics card for collaborative computing through wireless technologies, the card comprising:
   a Graphics Processing Unit (GPU) for data computing;
   a wireless controller for wirelessly receiving data from other graphic cards or sending data to the other graphics cards, and communicating with the GPU by bus; and
   a master card circuit that is directly coupled to the GPU and configured to:
      determine the GPU has encountered a heavy computing load;
      send a help request to the other graphics cards through the wireless controller;
      receive a rejection of the help request from a slave card circuit within a first other graphics card of the other graphics cards;
      wirelessly send data to be processed to a second graphic card if the second graphic card accepts the help request; and
      wirelessly receive a processing result from the second graphic card.

2. The card of claim 1 further comprises:
   a memory chip configured to store data and connected to the GPU by bus;
   a output interface configured to communicate with an output device and connected to the GPU by bus;
   a motherboard interface configured to communicate with a motherboard and connected to the GPU by bus; and
   a power chip for providing power.

3. The card of claim 2, wherein the motherboard interface is a PCI Express interface.

4. The card of claim 1, wherein the wireless controller is configured to modulate or demodulate the received data in accordance with an RF standard using RF carriers.

5. The card of claim 4, wherein the RF standard is one of the following communication standards: IEEE802.11, 802.11n and 802.11ac, Bluetooth or ultra broadband.

6. The card of claim 1, wherein the wireless controller is a chip or circuit that has a function of wireless control.

7. The card of claim 1, wherein the master card circuit is further configured to
   end, if no graphic card is able to accept the help request.

8. The card of claim 1, further comprising a slave card circuit that is directly coupled to the GPU and configured to:
   determine whether the GPU has free resources when a second help request is received from one of the other graphic cards;
   reject the second help request, if the GPU has no free resources;
   accept the second help request if the GPU has free resources, and wirelessly receive data to be processed from the one of the other graphic cards that sent the second help request; and
   wirelessly send a result of the processing through the wireless controller to the one of the other graphic cards that sent the second help request, after all the processing of the received data is completed.

9. A computing device, the device comprising:
an input device, for inputting data needed by a computing device;
a host, comprising a graphic card, the graphic card comprising:
a Graphics Processing Unit (GPU) for data computing;
a wireless controller for wirelessly receiving data from other graphic cards or sending data to the other graphics cards, and communicating with the GPU by bus; and
a master card circuit that is directly coupled to the GPU and configured to;
determine the GPU has encountered a heavy computing load;
send a help request to the other graphics cards through the wireless controller;
receive a rejection of the help request from a slave card circuit within a first other graphics card of the other graphics cards;
wirelessly send data to be processed to a second graphic card through the wireless controller if the second graphic card accepts the help request; and
wirelessly receive a processing result from the second graphic card through the wireless controller.

10. The device of claim 9, wherein the graphic card further comprises:
a memory chip configured to store data and connected to the GPU by bus;
a output interface configured to communicate with an output device and connected to the GPU by bus;
a motherboard interface configured to communicate with a motherboard and connected to the GPU by bus; and
a power chip for providing power.

11. The device of claim 9, wherein the wireless controller is configured to modulate or demodulate the received data in accordance with an RF standard using RF carriers.

12. The device of claim 11, wherein the RF standard is one of the following communication standards: IEEE802.11, 802.11n and 802.11ac, Bluetooth or ultra broadband.

13. The device of claim 11, wherein the wireless controller is a chip or circuit that has a function of wireless control.

14. The device of claim 9, wherein the master card circuit is further configured to
end, if no graphic card is able to accept the help request.

15. The device of claim 9, wherein the graphic card further comprises a slave card circuit that is directly coupled to the GPU and configured to:
determine whether the GPU has free resources when a second help request is received from one of the other graphic cards;
reject the second help request, if the GPU has no free resources;
accept the second help request if the GPU has free resources, and wirelessly receive data to be processed from the one of the other graphic cards that sent the second help request; and
wirelessly send a result of the processing through the wireless controller to the one of the other graphic cards that sent the second help request, after all the processing of the received data is completed.

16. A method for collaborative computing through wireless technologies with multiple graphic cards, the method comprising:
sending a help request when a first graphic card encounters heavy computing loads, wherein the first graphic card comprises:
a Graphics Processing Unit (GPU) for data computing;
a wireless controller for wirelessly receiving data from other graphic cards or sending data to the other graphics cards, and communicating with the GPU by bus; and
a master card circuit that is directly coupled to the GPU and configured to:
determine the GPU has encountered a heavy computing load;
send the help request to the other graphics cards through the wireless controller; and
receive a rejection of the help request from a slave card circuit within a second other graphics card of the multiple graphics cards;
ending, if no graphic card is able to accept the help request;
wirelessly sending by the first graphic card the data to be processed to a third graphic card of the multiple graphics cards through the wireless controller if the third graphic card is able to accept the help request;
processing by the third graphic card the sent data; and
wirelessly sending by the third graphic card a result of the processing to the first graphic card through the wireless controller, after all the processing of the sent data is completed.

17. The method of claim 16, wherein the wireless controller is configured to modulate or demodulate received data in accordance with an RF standard using RF carriers.

18. The method of claim 17, wherein the RF standard is one of the following communication standards: IEEE802.11, 802.11n and 802.11ac, Bluetooth or ultra broadband.

19. The method of claim 16, wherein the wireless controller is a chip or circuit that has a function of wireless control.

20. The method of claim 16, wherein the second graphic card comprises a second GPU that is directly coupled to the slave card circuit, and the slave card circuit is configured to:
determine whether the second GPU has free resources when the help request is received from the first graphic card;
reject the help request, if the second GPU has no free resources;
accept the help request if the second GPU has free resources, and wirelessly receive data to be processed by the second GPU from the first graphic card; and
wirelessly send the result of the processing to the first graphic card, after all the processing of the received data is completed.

* * * * *